March 27, 1956
L. L. HITCHCOCK
2,739,330
BRUSH ATTACHMENT FOR A METER BOX COVER LIFTER HOOK
Filed Oct. 6, 1952
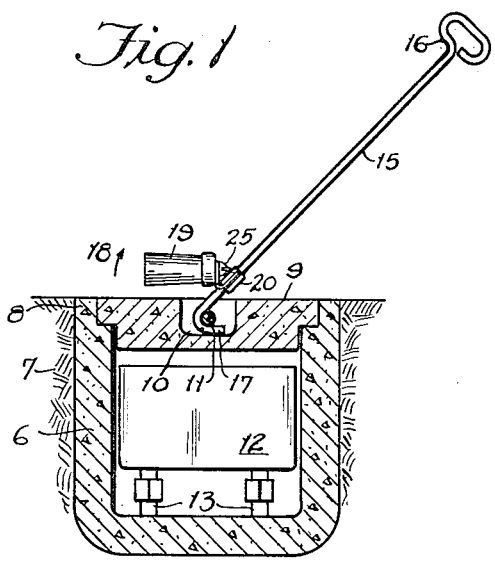
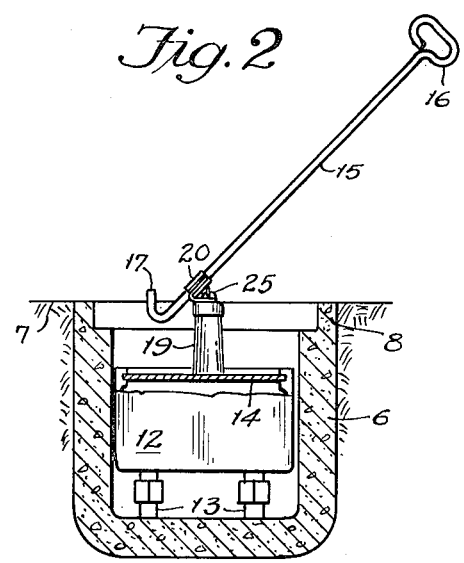
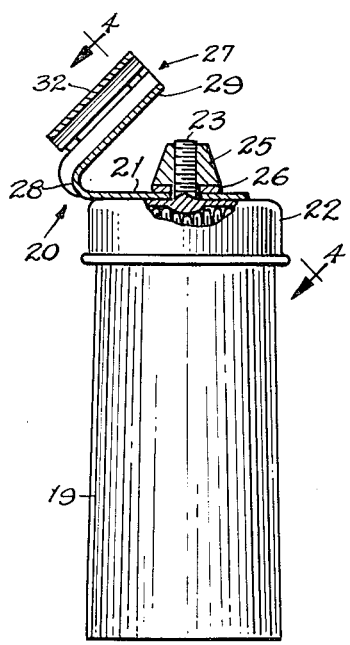
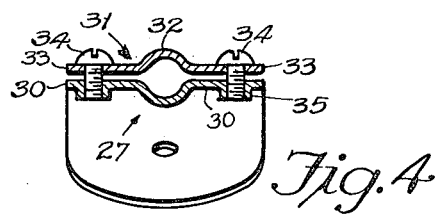
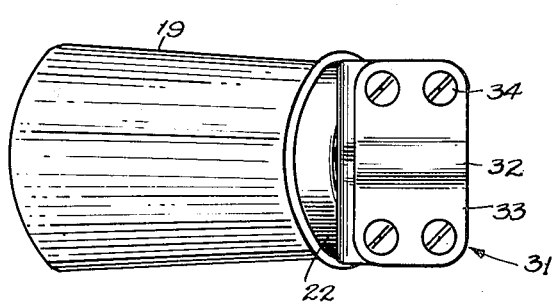
INVENTOR.
LEO L. HITCHCOCK
BY Sellers & Latta
— ATTORNEYS —

United States Patent Office 2,739,330
Patented Mar. 27, 1956

2,739,330

BRUSH ATTACHMENT FOR A METER BOX COVER LIFTER HOOK

Leo Lyle Hitchcock, Sun Valley, Calif.

Application October 6, 1952, Serial No. 313,277

1 Claim. (Cl. 15—176)

This invention relates to implements for facilitating the reading of meters (such as gas meters, water meters, etc.) that are installed in a meter box sunken in the ground and normally covered by a cover which must be lifted in order to expose the meter for reading. Two problems are involved in the process of reading the meter. The cover, which is ordinarily a fairly heavy concrete slab, lies flush with the surface of the ground, and it would be a tiring process for a meter reader, reading meters all day long, to stoop down and grasp the cover in his fingers in order to lift it. Accordingly, there is a need for an implement which can be used by the operator in a standing position, to lift the cover.

It is quite common for the glass window of the meter, which ordinarily rests in a horizontal position, facing upwardly, to become coated with dust until it is difficult to read the meter. Many meter readers do not take the trouble to clean off the window, because of the added trouble of stooping and wiping or brushing it off. Many incorrect readings result from this practice.

With the foregoing in mind, the general object of the present invention is to provide an implement which is adapted to encourage meter readers to clean off the meter window before reading the meter, and to this end the invention provides for a lifter hook, a brush for cleaning off the meter window, together with a holder for mounting said brush on said lifter hook, the hook and brush being arranged in such proximity that it requires only a slight shift of the implement to change it from its position in which it is adapted for lifting the meter box cover to a position in which it is adapted for brushing off the meter window.

Other objects will become apparent in the ensuing specifications and appended drawings in which:

Fig. 1 is a vertical sectional view through a meter box with my improved implement being used to raise the cover thereof;

Fig. 2 is a vertical sectional view of the meter box with the cover removed and the implement being used to clean the meter dial;

Fig. 3 is a full size fragmentary sectional view of the implement with the mounting bracket shown in section;

Fig. 4 is a transverse sectional view taken on the line 4—4 of Fig. 3 with the brush and brush attaching means removed therefrom; and Fig. 5 is a fragmentary plan view of the implement.

Referring now to the drawings in detail, I have shown, at 6, a cross sectional view of a conventional meter box sunken into the ground which is indicated at 7 and having an enlarged rim 8 to receive the meter box cover 9. The latter has a central, upwardly opening recess 10 which is traversed by a yoke 11 the ends of which are anchored in the cover 9 so as to provide a centrally disposed part which may be engaged for lifting the cover 9 from its normal position received in rim 8, with its upper face substantially flush with the surface of the ground 7.

I have also shown, within the meter box 6, a conventional meter 12 for measuring gas or water flowing through a supply line 13. Meter 12 has a dial face covered by a glass window 14 which should be occasionally cleaned of any accumulation of dust thereon, in order that the meter may be accurately read.

My improved implement comprises a shank 15 in the form of a relatively straight rod having at one end a handle 16 and having at its other end a lifter hook 17 adapted to engage beneath the yoke 11 while the shank 15 is inclined at an angle of from 45 to 60° with relation to the ground surface. In this position, the operator may stand back of the meter box 6 and extend the implement over the cover, sliding the hook 17 into the recess 10 and, by drawing the implement slightly toward him, causing the hook 17 to engage beneath yoke 11 in a position shown in Fig. 1, and then pulling the implement upwardly in the direction line of pull along shank 15, the cover 9 may be caused to lift as indicated by the arrow 18 in Fig. 1. The cover may then be laid to one side, preparatory to reading the meter.

The operator then rotates the implement about the axis of shank 15, approximately 180°, to bring into operative position a brush 19 which is attached to shank 15 substantially in a common plane with lifter hook 17 but projecting on the opposite side of the shank therefrom. Brush 19 projects at an acute angle to the end portion of shank 15 adjacent lifter hook 17, such angle being within the range of about 45° to 60°, such that with the shank 15 projecting upwardly in its normal position of use shown in Figs. 1 and 2, the brush 19 will project either straight downwardly on a vertical axis, as shown in Fig. 2 (its position of use) or substantially horizontally as shown in Fig. 1 (the position of use of lifter hook 17). In the latter position, the brush 19 adequately clears the upper face of cover 9, so that it will not interfere with the operation of lifter hook 17.

The invention provides relatively simple and inexpensive means for attaching the brush 19 to the shank 15 at the indicated angle of inclination. Such attaching means comprises a bracket indicated generally at 20. Bracket 20 has a flat arm 21 for attachment to the binding cup 22 in which the bristles of brush 19 are mounted. Such attachment is by means of a threaded stud 23, suitably anchored in the center of cup 22 and projecting axially therefrom, through an opening in an arm 21, together with a suitable nut such as the thumb nut 25 which is threaded on stud 23 and engages cup 22 through the medium of a lock washer 26.

Bracket 20 also includes a yoke portion 27 which is connected to arm 21, at an angle of between 45° and 60°, through a bend portion 28. Yoke 27 includes a central channel portion 29 to receive one side of shank 15, and a pair of ears 30, each having an aperture in each of its respective corners. A cap 31 has a central channel portion 32 adapted to receive the opposite side of shank 15, and a pair of ears 33 each provided with a pair of apertures to match the apertures of the respective ear 30. Cap screws 34 are extended through these apertures and threaded into bosses 35 in ears 30, for clamping the rod 15 between the cap 31 and the yoke 27.

The stud 23 provides a rotatable connection between brush 19 and bracket 20 such that, by loosening the thumb nut 25, the brush may be occasionally rotated to a new position to compensate for any unevenness in the wear of the ends of the bristles. Lockwasher 26 provides for locking the thumb nut against becoming loose on stud 23, so that the brush may always be tightly attached to the bracket 20.

It will now be apparent that the implement may be used to lift the cover 9 from the meter box, and then, by simply rotating the implement 180°, may be employed for sweeping the dust off the window 14 while the shank 15 and handle 16 remain substantially in the same positions as in the use of the implement for lifting the cover. During the entire operation the operator may stand upright. With the window 14 well cleaned, he may accurately read the meter without stooping. Thus the labor of reading meters is greatly reduced, and accuracy is enhanced.

I claim:

For attachment to a meter box cover lifter having a shank of rod form and, at one end thereof, a hook formed as an integral continuation thereof, for engaging and lifting the cover of a meter box sunken in the ground: a brush and a brush mounting device comprising a binding cup for the brush and a threaded stud projecting from the closed end of the cup; a bracket having an arm provided with an aperture through which said stud projects; a nut threaded on said stud for securing the brush to said arm; said bracket having a yoke portion disposed generally in a plane subtending a dihedral angle of approximately 45° to said arm, said yoke having a central channel portion to receive one side of said shank and a pair of ears on either side of said channel portion; a clamping cap having a channel shaped central portion to receive the other side of the shank and a pair of ears registering with the ears of said yoke portion; and a pair of securing elements extending through the respective ears of said yoke and cap and securing them together for adjustably clamping the shank between said yoke portion and cap, and brush being of greater length than breadth.

References Cited in the file of this patent

UNITED STATES PATENTS

| 497,721 | Kellogg | May 16, 1893 |
| 1,814,413 | Schulman | July 14, 1931 |
| 1,857,668 | Sund | May 10, 1932 |
| 2,689,967 | Mackey | Sept. 28, 1954 |

FOREIGN PATENTS

| 761,199 | France | Jan. 3, 1934 |